United States Patent Office 2,903,589
Patented Sept. 8, 1959

2,903,589

METHOD FOR PREPARING AN ELECTRON MICROSCOPE SPECIMEN

William A. Ladd, Roslyn Heights, N.Y., assignor to Columbian Carbon Company, New York, N.Y., a corporation of Delaware No Drawing. Application June 9, 1955
Serial No. 514,397

6 Claims. (Cl. 250—65)

The present invention relates to X-ray microscopy and provides a method of examining the internal, as well as the external, structures of particles of matter and living biological organisms and tissues in minutiae not heretofore possible.

The internal structures of matter have heretofore been examined by utilizing the penetrating properties of X-rays and their effects on photographic emulsions or the like. Though highly revealing in many of its applications, the extent of resolution by this means has been quite limited.

The presently available electron microscope has tremendous resolving powers but is ineffectual for examining most internal structures. Further the electron microscope is not adaptable to examination of living biological organisms or tissues because of the destructive effects of the required vacuum desiccation and of the electron bombardment.

Attempts have heretofore been made to utilize the resolving powers of the light microscope in conjunction with the revealing powers of the X-ray by preparing a photographic image of the specimen by conventional X-ray technique and then subjecting the image so prepared to light microscope examination. Though moderately effective, the resolution obtained in this way by the light microscope has been limited to 200–300 magnifications by the grain size of the photographic image of the specimen prepared by X-ray technique.

I have discovered a method whereby the tremendous resolving power of the electron microscope may be utilized in examining internal, as well as external, structures of particles of matter and of living biological organisms and tissues which is not subject to the limitations heretofore imposed by known procedures.

In accordance with my improved method, I utilize the revealing powers of short wave radiation, for instance X-rays, to produce a matrix, or relief image, of the specimen from a substance which is entirely homogeneous and free from grain structure, and I utilize the matrix so produced in preparing a replica suitable for electron microscope examination, all as more fully hereinafter described.

In preparing the original matrix, I utilize the power of the X-rays, for instance, to alter the chemical or physical characteristics of certain materials and I use as the composition of the matrix either a homogeneous, amorphous material entirely free from grain structure or else a single crystal having a mirror-like surface. A further essential characteristic of this material is that it be sensitive to short wave radiation, X-rays for instance, in a manner such that its chemical or physical characteristics are altered, to an extent depending upon the intensity of the radiation reaching its surface, to permit a preferential etching away of the surface of the material to form the relief image of the specimen, referred to herein as the matrix.

According to my presently preferred procedure, I use in preparing the matrix a radiation-sensitive material, of the type described, of which the solubility is affected proportionate to the radiation intensity. However, materials of which other physical or chemical characteristics are altered in proportion to radiation intensity so as to permit selective etching away of their surface may also be used.

I have, with particular advantage, used for this purpose a relatively thin sheet of a clear, radiation-sensitive plastic composed of copolymers of polyvinyl chloride acetate, say about 10 mils in thickness. A similar sheet of polyvinyl chloride may also be used. The thickness of the plastic sheet is not of primary importance, but it should be sufficient to be rather rigid and to facilitate handling. I have also used with excellent results, a crystal of ammonium dichromate having a mirror-like surface prepared by the method described and claimed in my copending application Ser. No. 514,398 filed concurrently herewith, now Patent No. 2,835,606.

In using the polyvinyl chloride acetate film, the specimen to be examined may be placed in contact with a smooth surface of the sheet and exposed to X-rays preferably soft X-rays. For this purpose, I may use with advantage X-rays produced at 5 to 15 kv. at about 20 milliamperes, the specimen being placed about 1¾ to 2 inches from the target spot of the X-ray tube. Preferably the target spot should not exceed about 1 x 1½ mm. The time of exposure will depend largely upon the particular specimen being examined and the distance from target and may range from 2 to 48 hours.

The solubility of the thus irradiated film in acetone solution has been found to be generally inversely proportionate to the intensity of the radiation falling on its surface, though it will be understood that this is not necessarily a straight line relationship.

As the preferential solvent for the plastic, I prefer to use a 30% solution of acetone in distilled water. However, the concentration of the solution is subject to some variation, say within the range of 10% to 40%. I have found that where the acetone concentration exceeds about 45%, the film becomes limp and its rigidity destroyed. At a concentration of 30%, the exposed film may be left in the solution for a period of time ranging from 15 minutes to 3½ hours. At lower concentrations, even longer time periods may be required. Care must be exercised to prevent overdevelopment of the film, as too prolonged an exposure to the solvent destroys the detail of the matrix. For best results, the time should be so coordinated with the concentration of the solution as to give maximum contrast without destruction of detail.

Having produced this non-grained homogeneous matrix, a replica thereof suitable for electron microscope examination may then be prepared according to standard electron microscope technique. See, for instance, Introduction To Electron Microscopy by Cecil E. Hall, McGraw-Hill Book Company, Inc., 1953. However, care must be exercised to avoid the use of a replica-forming material containing a solvent which is also a solvent for the matrix. Frequently, it is found desirable to form directly from the matrix an intermediate relief from which the replica is made.

A particularly advantageous procedure for producing the final replica is first to produce from the matrix a relatively thick relief, say about 1/64 to 1/32 inch thickness, using a 1% solution of polyvinyl alcohol in water. This material is applied to the relief surface of the matrix, permitted to set by the evaporation of water and is then manually stripped from the matrix. The relief thus produced is then placed, replica-side up, on a glass slide and suspended in a chamber adapted to be evacuated. A film of silicon monoxide is then formed on the surface of the polyvinyl alcohol relief by evaporating silicon monoxide onto the surface of the relief. A microscope screen is then glued to the silicon monoxide film and the polyvinyl alcohol dissolved from the film in water. The replica is then dried, shadow-cast and placed in the electron microscope for examination.

Instead of silicon monoxide, other standard electron microscope replica-forming materials may be used, for instance collodion or polyvinyl resin (Formvar), silica or carbon. The use of carbon for replication, since it does not fill in the matrix but follows the contour with a thin film, is particularly useful for matrices which have a wide range in depths and which when other replicating materials are used, would present a specimen totally unsatisfactory for electron microscope examination because of opacity. The shadow-casting is with advantage effected by the use of chromium vapors or uranium or other metal vapors according to standard electron microscope shadow-casting technique, as previously noted.

In using a radiation-sensitive salt crystal for producing the matrix, special pains should be taken in growing and drying the crystal, for instance, as disclosed in my previously noted copending application, so as to obtain a mirror-like surface at least ⅛" x ⅛" and preferably, ¼" x ¼". The specimen to be examined is placed in close contact with the mirror-like surface of the crystal and exposed to soft X-rays as previously described. For this purpose, one may with advantage use X-rays produced at 5 to 20 kv. and the exposure may range from 4 to 48 hours, depending upon the specimen. The solubility of the crystal surface in various solvents, hereinafter noted, is selectively retarded by the radiation in proportion to the intensity thereof.

As the selective solvent for ammonium dichromate crystals, I prefer to use absolute ethyl alcohol at room temperature. Even minor proportions of water in the ethyl alcohol have been found to destroy its selective solubility for this purpose. The crystal surface will usually be etched to an optimum extent to form a satisfactory matrix in from 7 to 15 minutes where absolute ethyl alcohol is used as the solvent. In place thereof, one may use, with advantage, absolute methyl alcohol or absolute propyl alcohol or aqueous solutions of methyl or propyl alcohol or slightly unsaturated aqueous solutions of ammonium dichromate, the time factor depending upon the solvent strength of the solvent.

Following the etching of the crystal surface, before it is permitted to dry, the crystal is advantageously placed in a 4% solution of collodion in amyl acetate and agitated slowly. It is then removed from the collodion solution, the adhering collodion permitted to dry slowly and the dried collodion film stripped from the crystal.

The film replica for electron microscopic examination may then be prepared by flowing an amyl acetate solution of collodion, concentration about 1%, over the relief surface of the crystal, as by means of a pipette, or in place of collodion, 1–2% solution of a polyvinyl resin of the type marketed under the trade name "Formvar" in ethylene dichloride may be used. Or in place thereof, one may form the film from silicon monoxide as previously described. A microscope screen is then glued to the surface of the film and the crystal dissolved away, for instance in water. The replica surface of the resultant film is then shadow-cast, as previously described, and subjected to electron microscopic examination.

In place of ammonium dichromate crystals one may use crystals of other radiation sensitive materials, for instance quinoline dichromate or pyridine dichromate. However, difficulty has been encountered in growing such crystals to sufficient size. Crystals of radiation sensitive silver salts may also be used where attainable in sufficient size.

Films of gelatin and of albumin have not been generally found to be suitable for my purpose because of excessive swelling and the resultant distortion of the relief image. The polyvinyl films and the crystals herein described are especially suitable for my purpose because they are not subject to this defect.

The following specific examples will serve further to illustrate the invention without limiting the scope thereof.

*Example I*

In this procedure the specimen was a carbon black marketed under the trade name Thermax and the radiation-sensitive material was a crystal of ammonium dichromate obtained from the seventh recrystallization from aqueous solution and prepared in accordance with my previously noted copending application.

The crystal was first given a protective coating of collodion from a 1% solution in amyl acetate. The Thermax was mixed with a 1% solution of Formvar in ethylene dichloride and a drop of the mixture placed on the collodion film over a mirror surface of the crystal and allowed to dry. The crystal was then placed with the Thermax toward the source of X-rays at about 2" from the target of a copper X-ray tube—Phillips type #32112—having a target spot 1 mm. x 1.5 mm. The crystal was exposed to X-rays of 9.5 kv., 20 milliamperes for a period of 23 hours. After exposure, a thick collodion film was placed on the crystal surface that had been exposed and after drying the composite film was stripped off leaving the bare crystal surface.

The crystal was then developed for 7 minutes at room temperature with gentle agitation in absolute ethyl alcohol. It was then removed and immediately placed in a 4% collodion-amyl acetate solution, agitated slowly, removed and allowed to dry. The collodion film was then stripped from the crystal leaving the matrix. A drop of 1% Formvar in ethylene dichloride was then placed on the matrix and allowed to dry. A 200 mesh electron microscope screen was glued to this film with Duco cement. The crystal was then dissolved in water leaving the replica. The Formvar replica was then placed in an evaporating chamber and metallic chromium evaporated onto the relief surface thereof at an angle such as to produce shadowing in accordance with standard electron microscope technique. The shadowed replica was then photographed in the electron microscope to a final magnification of 10,000 diameters.

Details of particles of the carbon (Thermax) were revealed by this technique. Hitherto these particles were revealed only by the electron microscope, as they are below the resolution of the light microscope in particle size.

*Example II*

In this procedure the specimen was 200 mesh lead particles and the radiation-sensitive material was a crystal of ammonium dichromate crystal obtained from the eleventh recrystallization from aqueous solution and prepared as in Example I.

As in the preceding example, the crystal was protected with a thin collodion film, the lead particles were mixed in Formvar and ethylene dichloride and a drop of this mixture was placed on the crystal and allowed to dry. The crystal was then exposed to X-rays of 20 kv., 20 milliamperes for 20 hours. The film was removed as in Example I, and the crystal was developed for 2 hours in a preferential solvent composed of 40 cc. of ethylene dichloride, 40 cc. amyl acetate and 30 cc. of absolute methyl alcohol, at room temperature. It was then removed and placed in 4% collodion and amyl acetate after which it was removed and allowed to dry and the film stripped off. The replica was prepared as in Example I and examined in the electron microscope. The micrographs thus produced showed detail of the particles far below the range of the light microscope. The micrographs also showed overlapping of the lead particles, indicating differential penetration of the X-rays, something the light microscope is incapable of revealing.

Example III

In this procedure the specimen was the Thermax carbon black used in Example I and the radiation-sensitive material was a clear plastic film of copolymers of polyvinyl chloride acetate about 10 mils thick, manufactured by Nixon Nitration Works of Nixon, New Jersey and marketed under the designation "Rigid Vinyl Film."

The Thermax was mixed with a 1% aqueous solution of polyvinyl alcohol. A drop of this mixture was then placed on a 1" square of the plastic film and allowed to run down the film and dry. The square was then taped with Scotch tape to the X-ray port at a distance of 2" from the target. It was then irradiated for 23 hours, 10 kv., 17 milliamperes. The square was then removed from the X-ray port and the polyvinyl alcohol film and Thermax removed by washing with water.

The film was then developed in 30% acetone in water for 1 hour. It was removed from the solution, washed in distilled water and then blotted between filter papers. Several drops of 1% polyvinyl alcohol in water were placed on the matrix and allowed to dry thoroughly. The polyvinyl alcohol relief was then stripped from the matrix and placed replica side upwards on a glass slide. The edges were taped to the slide with Scotch tape, the slide, with replica side down, was placed above the evaporating basket in a metal evaporator and silicon monoxide evaporated onto the relief surface. A 200 mesh electron microscope screen was then glued to the silicon monoxide surface with Duco cement and the polyvinyl alcohol dissolved in water for a period of 12 to 24 hours leaving the replica. The replica was then shadow-cast with chromium and examined in the electron microscope according to standard procedure.

Well defined images of the Thermax particles appeared in the resultant micrographs, aggregates of the Thermax particles being readily distinguished from well dispersed discrete particles.

My new micro technique also makes possible X-ray diffraction studies on minute single crystals far below the one micron size limit previously imposed by existing techniques.

I claim:

1. Method of X-ray microscopy which comprises exposing to a field of X-rays passing through a specimen a rigid, smooth surface of a radiation-sensitive homogeneous material free from grain structure and resistant to swelling, said material being one selected from the group consisting of a copolymer of polyvinyl chloride acetate, polyvinyl chloride and crystals of ammonium dichromate, quinoline dichromate and pyridine dichromate, treating the surface with a selective solvent for the material and thereby selectively etching away those portions of the surface not rendered insoluble by the radiation and thus producing a relief matrix corresponding to the specimen, and preparing from said matrix a replica thereof on a thin film suitable for electron microscope examination.

2. Method of X-ray microscopy which comprises the following steps, exposing to a field of X-rays passing through a specimen a rigid, smooth surface of a homogeneous material consisting essentially of copolymers of polyvinyl chloride acetate free from grain structure, selectively dissolving from the exposed surface of the plastic by means of a selective solvent portions thereof not rendered insoluble by the radiation and thus producing a relief matrix corresponding to the specimen, and preparing from said matrix a replica thereof on a thin film suitable for electron microscope examination.

3. The method of claim 2 in which the selective solvent is an aqueous acetone solution of a concentration within the range of 10 to 40% by weight.

4. The method of claim 3 in which the concentration of the acetone solution is about 30% by weight and the surface of the polyvinyl chloride acetate film is exposed thereto for a period of time ranging from 15 minutes to 3½ hours.

5. The method of claim 1 in which the radiation-sensitive material is a crystal of ammonium dichromate and the selective solvent is one of a group of solvents consisting of absolute ethyl alcohol, absolute methyl alcohol, absolute propyl alcohol, aqueous solutions of methyl alcohol, aqueous solutions of propyl alcohol and slightly unsaturated aqueous solutions of ammonium dichromate.

6. Method of claim 1 in which the X-rays are soft ones produced at 5 to 20 kv. and about 20 milliamperes, and the specimen is in close contact with said smooth surface and said surface is spaced from the target spot of the X-ray tube a distance of about 1¾ to 2 inches.

References Cited in the file of this patent

UNITED STATES PATENTS

| | | |
|---|---|---|
| 1,789,615 | Baker et al. | Jan. 20, 1931 |
| 2,347,965 | Ramberg | May 2, 1944 |
| 2,417,110 | Hillier | Mar. 11, 1947 |
| 2,448,594 | Hillier et al. | Sept. 7, 1948 |